(12) United States Patent
Uemoto et al.

(10) Patent No.: US 11,022,178 B2
(45) Date of Patent: Jun. 1, 2021

(54) SEALING DEVICE AND ROLLING BEARING DEVICE

(71) Applicant: JTEKT CORPORATION, Osaka (JP)

(72) Inventors: Takafumi Uemoto, Kashiwara (JP); Yuya Yamamoto, Osaka (JP); Takuya Toda, Kashiwara (JP); Suguru Nakajima, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/801,971

(22) Filed: Feb. 26, 2020

(65) Prior Publication Data

US 2020/0292001 A1 Sep. 17, 2020

(30) Foreign Application Priority Data

Mar. 13, 2019 (JP) .............................. JP2019-045479

(51) Int. Cl.
*F16C 19/08* (2006.01)
*F16C 19/18* (2006.01)
(Continued)

(52) U.S. Cl.
CPC .......... *F16C 33/80* (2013.01); *B60B 27/0005* (2013.01); *F16C 19/08* (2013.01); *F16C 19/181* (2013.01); *F16C 33/768* (2013.01); *F16C 33/7823* (2013.01); *F16J 15/3232* (2013.01); *B60B 2900/5112* (2013.01);
(Continued)

(58) Field of Classification Search
CPC .... F16C 19/08; F16C 19/185; F16C 33/7823; F16C 33/768; F16C 33/7863; F16C 33/80; F16C 33/805; F16C 2326/02; F16C 19/181; F16J 15/447; F16J 15/3232;
(Continued)

(56) References Cited

U.S. PATENT DOCUMENTS

| | | | | |
|---|---|---|---|---|
| 5,813,675 | A | * 9/1998 | Otto | ................... F16C 33/7883 277/549 |
| 9,328,771 | B2 | * 5/2016 | Duch | .................... F16C 33/783 |
| 9,982,713 | B2 | * 5/2018 | Seo | ..................... B60B 27/0005 |
| 10,233,973 | B2 | * 3/2019 | Wollert | ................. F16C 33/805 |

(Continued)

FOREIGN PATENT DOCUMENTS

| | | | | |
|---|---|---|---|---|
| JP | 2013018478 A | * | 1/2013 | ............ F16C 33/805 |
| JP | 2013-534301 A | | 9/2013 | |

(Continued)

*Primary Examiner* — Marcus Charles
(74) *Attorney, Agent, or Firm* — Oliff PLC

(57) ABSTRACT

A sealing device includes a seal member and a slinger. The slinger has a slinger fixing part, a first radial part, a first axial part, a second radial part, and a second axial part facing a seal fixing part of the seal member in a radial direction across a first clearance. The seal member has a large-diameter part facing, in an axial direction, an end of the second axial part on the other side in an axial direction across a second clearance. An outer circumferential surface of the large-diameter part and an outer circumferential surface of the second axial part are included in a flow passage surface of a continuous outside flow passage that extends in a straight line along the axial direction. The first clearance and the second clearance communicate with each other, and the sealing device has a labyrinth clearance including the first clearance and the second clearance.

5 Claims, 6 Drawing Sheets

(OTHER SIDE) ← (AXIAL DIRECTION) → (ONE SIDE)

(51) Int. Cl.
*F16C 33/76* (2006.01)
*F16C 33/78* (2006.01)
*F16J 15/44* (2006.01)
*B60B 27/00* (2006.01)
*F16C 33/80* (2006.01)
*F16J 15/3232* (2016.01)
*F16J 15/447* (2006.01)

(52) U.S. Cl.
CPC ... *B60B 2900/5114* (2013.01); *F16C 2326/02* (2013.01); *F16J 15/447* (2013.01)

(58) Field of Classification Search
CPC ............ B60B 27/0005; B60B 27/0073; B60B 27/0094; B60B 2900/5112; B60B 2900/5114
USPC ............... 384/477, 474, 478, 480, 486, 544; 277/351, 407, 412, 549, 562, 572
See application file for complete search history.

(56) References Cited

U.S. PATENT DOCUMENTS

| | | | |
|---|---|---|---|
| 2013/0127119 A1 | 5/2013 | Haepp et al. | |
| 2015/0151574 A1* | 6/2015 | Barberis | B60B 27/0005 384/486 |
| 2016/0003302 A1* | 1/2016 | Seno | F16C 33/7886 277/351 |
| 2017/0198748 A1* | 7/2017 | Seo | F16C 33/80 |

FOREIGN PATENT DOCUMENTS

| | | | | | |
|---|---|---|---|---|---|
| JP | 2015137754 A | * | 7/2015 | ............ | F16C 33/805 |
| JP | 2017013706 A | * | 1/2017 | ............ | F16C 33/805 |
| JP | 2017015125 A | * | 1/2017 | ............ | F16C 33/80 |
| JP | 2017057930 A | * | 3/2017 | ........... | F16J 15/3264 |
| JP | 2017089684 A | * | 5/2017 | | |
| KR | 101540981 B1 | * | 7/2015 | ........... | F16J 15/3256 |
| WO | WO-2017038751 A1 | * | 3/2017 | ........... | F16J 15/447 |
| WO | WO-2019172291 A1 | * | 9/2019 | ............ | F16C 33/78 |

* cited by examiner (AXIAL DIRECTION)
(OTHER SIDE) ←⎯⎯⎯⎯→ (ONE SIDE)

SEALING DEVICE AND ROLLING BEARING DEVICE

CROSS-REFERENCE TO RELATED APPLICATION

This application claims priority to Japanese Patent Application No. 2019-045479 filed on Mar. 13, 2019, incorporated herein by reference in its entirety.

BACKGROUND

1. Technical Field

The disclosure relates to a sealing device and a rolling bearing device having a sealing device.

2. Description of Related Art

Vehicles, such as automobiles, employ a wheel bearing device (hub unit) to support a wheel. The wheel bearing device includes an outer ring member (also called an outer member) mounted on a vehicle body, an inner shaft member (also called an inner member) on which the wheel is mounted, and a plurality of rolling elements (balls) disposed between the outer ring member and the inner shaft member. It is necessary to prevent water from entering a bearing inner space of the wheel bearing device where the rolling elements are provided. In the case of a wheel bearing device, such water contains mud. To prevent entry of water, a sealing device is provided between the outer ring member and the inner shaft member. Published Japanese Translation of PCT Application No. 2013-534301 (JP-A-2013-534301) discloses a sealing device that is provided on a vehicle outer side (outboard side) of a wheel bearing device.

SUMMARY

As shown in FIG. 5, the sealing device described in JP-A-2013-534301 has an annular seal member 91 mounted on an outer circumferential surface 90b of an outer ring member 90, and an annular slinger 94 mounted on an inner shaft member 92. A labyrinth clearance 96 is formed between a part 91a of the seal member 91 and a part 94a of the slinger 94. A catch groove 95 is formed between the part 94a of the slinger 94 and a flange 93 of the inner shaft member 92.

Foreign objects such as water present on the outer circumferential side of the outer ring member 90 flows down in a circumferential direction along the cylindrical outer ring member 90, but part of the water may flow down in an axial direction along the outer circumferential surface 90b. In the case of the sealing device shown in FIG. 5, if water having flowed in the axial direction along the outer circumferential surface 90b of the outer ring member 90 (arrow F) flows over the seal member 91, the water will flow into the catch groove 95. When the flow volume of water becomes large, the water caught by the catch groove 95 may enter through the labyrinth clearance 96.

FIG. 6 is a sectional view showing a sealing device of another related art. This sealing device includes an annular seal member 91 mounted on an outer ring member 90, and an annular slinger 94 mounted on an inner shaft member 92. The seal member 91 has a cylindrical seal fixing part 97 mounted on a part 90a of an outer circumferential surface of the outer ring member 90, and a seal main body 99 having a seal lip 98. The slinger 94 has a slinger fixing part 100 mounted on a part 92a of an outer circumferential surface of the inner shaft member 92, a radial part 101 which extends from the slinger fixing part 100 toward a radially outer side and with which the seal lip 98 is in contact, and an axial part 102 that extends in an axial direction from an end 101a of the radial part 101 on the radially outer side.

The axial part 102 has a cylindrical shape and faces the seal fixing part 97 in the radial direction across a clearance. The clearance between the axial part 102 and the seal fixing part 97 is set to be small such that this clearance serves as a labyrinth clearance 103. The labyrinth clearance 103 restricts entry of water to the inside of the sealing device where the seal lip 98 is present. Thus, water is less likely to reach the clearance between the seal lip 98 and the slinger 94, so that mud contained in water is prevented from getting caught between the seal lip 98 and the slinger 94 and wear on the seal lip 98 is reduced. As a result, the performance of the sealing device can be maintained for a long time, and foreign objects can be prevented from entering a bearing inner space 105 between the outer ring member 90 and the inner shaft member 92, which contributes to extending the life of the rolling bearing device.

One drawback is that the labyrinth clearance 103 opens in the axial direction (the leftward direction in FIG. 6). This can restrict entry of water that stagnates in the vicinity of an opening 104 of the labyrinth clearance 103. However, depending on the volume of water flowing in the axial direction along the outer circumferential surface 90b of the outer ring member 90 (arrow F), part of the water may enter through the opening 104 and pass through the labyrinth clearance 103. In this case, the water may reach the clearance between the seal lip 98 and the slinger 94, and mud contained in the water may accelerate wear on the seal lip 98, thereby degrading the sealing performance. Then, foreign objects may enter the bearing inner space 105.

How to prevent entry of foreign objects such as water into the bearing inner space 105 is a challenge not only for wheel bearing devices but also for other bearing devices. Therefore, the present disclosure provides a sealing device and a rolling bearing device that have an enhanced function of preventing external water from entering a space between an outer member and an inner member.

A sealing device according to a first aspect of this disclosure includes an annular seal member mounted on an outer member, and an annular slinger mounted on an inner member that rotates relatively to the outer member. The seal member has a cylindrical seal fixing part that is mounted on a part of an outer circumferential surface of the outer member, and a seal main body that has a seal lip. The slinger has a slinger fixing part that is mounted on a part of an outer circumferential surface of the inner member; a first radial part which extends from an end of the slinger fixing part on one side in an axial direction toward a radially outer side and with which the seal lip is in contact; a first axial part that extends from an end of the first radial part on the radially outer side toward the other side in the axial direction; a second radial part that extends from an end of the first axial part on the other side in the axial direction toward the radially outer side; and a second axial part that extends from an end of the second radial part on the radially outer side toward the other side in the axial direction and faces the seal fixing part in a radial direction across a first clearance. The seal member has a large-diameter part that has a larger outside diameter than the seal fixing part and faces, in the axial direction, an end of the second axial part on the other side in the axial direction across a second clearance. An outer circumferential surface of the large-diameter part and an outer circumferential surface of the second axial part are included in a flow passage surface of a continuous outside flow passage that extends in a straight line along the axial direction. The first clearance and the second clearance communicate with each other, and the sealing device has a labyrinth clearance including the first clearance and the second clearance.

In this sealing device, the labyrinth clearance makes it less likely that external water enters the inside of the sealing device where the seal lip is present. The seal member has the large-diameter part. The large-diameter part has a larger outside diameter than the seal fixing part and faces, in the axial direction, the end of the second axial part of the slinger on the other side in the axial direction across the second clearance. Thus, as the large-diameter part serves as a barrier, water flowing toward the one side in the axial direction along the outer circumferential surface of the outer member is less likely to enter inside the sealing device. Since the second clearance formed between the large-diameter part and the second axial part opens toward the radially outer side, even when a large volume of water flows and part of the water flows over the large-diameter part toward the one side in the axial direction, this water is less likely to enter through the opening of the second clearance and passes by the opening. The outer circumferential surface of the large-diameter part and the outer circumferential surface of the second axial part are included in the flow passage surface of the continuous outside flow passage extending in a straight line along the axial direction. Therefore, even when a large volume of water flows and part of the water flows over the large-diameter part toward the one side in the axial direction, this water can pass by the opening of the second clearance, without stagnating near the opening, and flow along the outer circumferential surface of the second axial part. Thus, water is less likely to enter through the opening of the second clearance. For these reasons, the sealing device has an enhanced function of preventing external water from entering the space between the outer member and the inner member.

In the above aspect, the outer circumferential surface of the large-diameter part and the outer circumferential surface of the second axial part may be equivalent in diameter. Thus, a configuration in which the outer circumferential surface of the large-diameter part and the outer circumferential surface of the second axial part are included in the flow passage surface of the continuous outside flow passage extending in a straight line along the axial direction can be easily obtained. The meaning of "equivalent" here includes not only that two diameters are exactly the same but also that two diameters are slightly different from each other due to manufacturing errors, assembly errors, etc.

In the above aspect, at least a portion of the first radial part may have a contact surface that is in contact with an annular wall surface of the inner member that extends toward the radially outer side from a part of the outer circumferential surface of the inner member at which the slinger fixing part is fixed to the inner member, and an outer circumferential surface of the first axial part and a stepped surface of the inner member that extends from an end of the wall surface on the radially outer side toward the one side in the axial direction may constitute a bottom surface of a common gutter structure.

In this configuration, the gutter structure is constituted by a part of the slinger and a part of the inner member. The bottom surface of this gutter structure is constituted by the outer circumferential surface of the first axial part of the slinger and the stepped surface of the inner member. When a large volume of water flows toward the one side in the axial direction along the outer circumferential surface of the outer member and part of the water flows over the large-diameter part toward the one side in the axial direction, and further flows along the outer circumferential surface of the second axial part, this water is caught by the gutter structure. Other than the outer circumferential surface of the first axial part of the slinger, the stepped surface of the inner member is also included in the bottom surface of the gutter structure, which adds to the volume of the gutter structure and allows the gutter structure to catch a large volume of water. As water is caught by the gutter structure, water can be restrained from flowing toward the second clearance by changing its flow direction to a direction toward the other side in the axial direction.

In the above aspect, the second clearance may have a dimension of 0.6 mm or smaller. In this configuration, the opening of the second clearance has a dimension of 0.6 mm or smaller. Water in the vicinity of this opening is less likely to enter the labyrinth clearance due to the action of surface tension.

A rolling bearing device according to a second aspect of this disclosure includes: an outer member; an inner member; a plurality of rolling elements provided between the outer member and the inner member; and a sealing device that prevents foreign objects from entering a bearing inner space which is between the outer member and the inner member and in which the rolling elements are provided. The sealing device is the sealing device according to the first aspect. This rolling bearing device has an enhanced function of preventing external water from entering the bearing inner space.

In the above aspect, the inner member may have a shaft main body that has a part of an outer circumferential surface of the inner member at which the slinger fixing part is fixed to the inner member, and a flange that extends from one side of the shaft main body in the axial direction toward a radially outer side. The flange may have an annular wall surface that extends toward the radially outer side from the part of the outer circumferential surface of the inner member at which the slinger fixing part is fixed to the inner member, and a stepped surface that extends from an end of the wall surface on the radially outer side toward the one side in the axial direction. At least a portion of the first radial part of the slinger may have a contact surface that is in contact with the annular wall surface. An outer circumferential surface of the first axial part and the stepped surface may constitute a bottom surface of a common gutter structure.

In this configuration, the gutter structure is constituted by a part of the slinger and a part of the inner member. The bottom surface of this gutter structure is constituted by the outer circumferential surface of the first axial part of the slinger and the stepped surface of the inner member. When a large volume of water flows toward the one side in the axial direction along the outer circumferential surface of the outer member and part of the water flows over the large-diameter part toward the one side in the axial direction, and further flows along the outer circumferential surface of the second axial part, this water is caught by the gutter structure. Other than the outer circumferential surface of the first axial part of the slinger, the stepped surface of the inner member is also included in the bottom surface of the gutter structure, which adds to the volume of the gutter structure and allows the gutter structure to catch a large volume of water. As water is caught by the gutter structure, water can be restrained from flowing toward the second clearance by changing its flow direction to a direction toward the other side in the axial direction.

In the rolling bearing device having the above aspect, the function of preventing external water from entering the space between the outer member and the inner member is enhanced by the sealing device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Rolling Bearing Device

Figure 1:
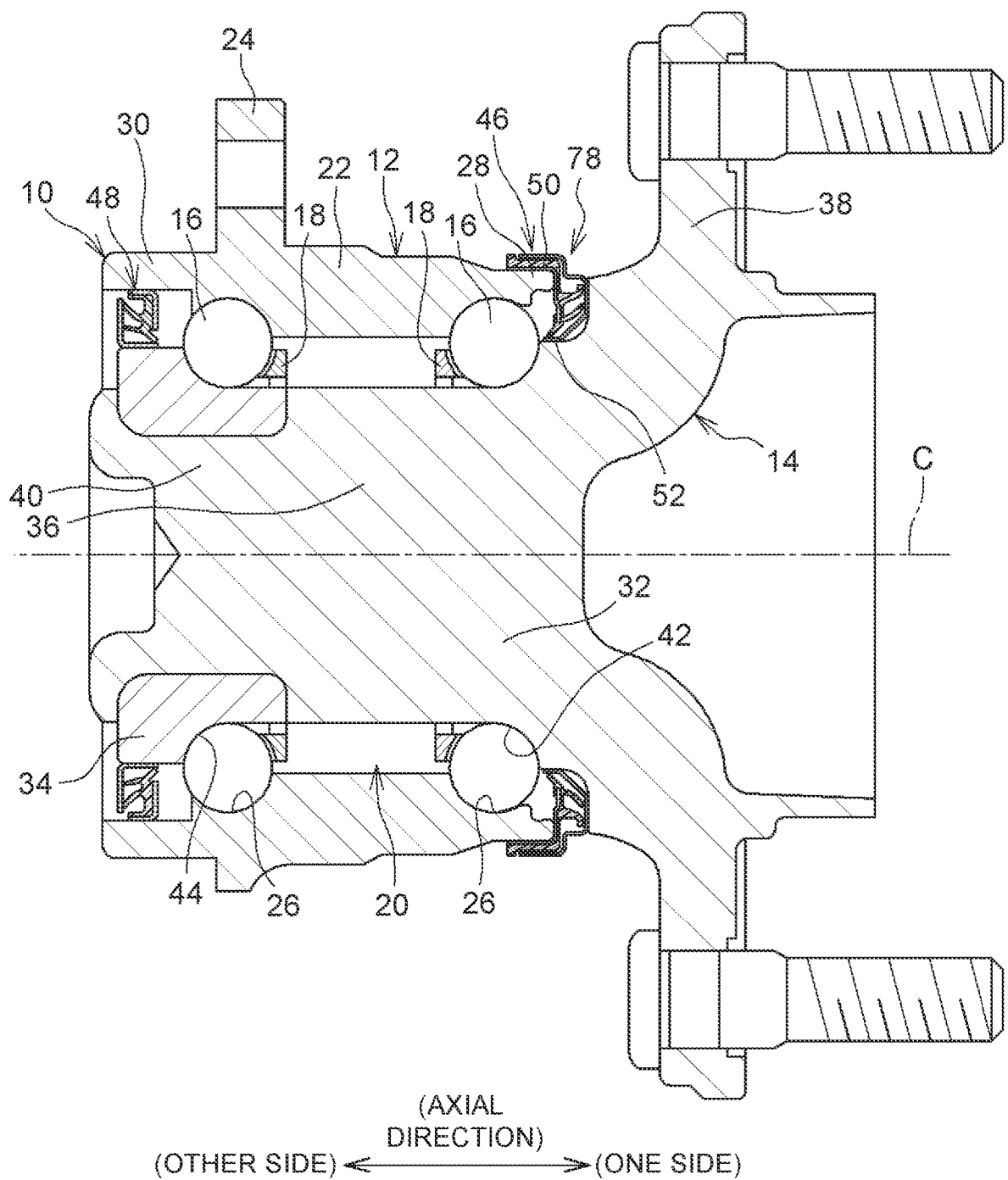
FIG. 1 is a sectional view showing an example of a rolling bearing device.

FIG. 1 is a sectional view showing an example of a rolling bearing device. A rolling bearing device 10 (hereinafter also referred to as a "bearing device 10") shown in FIG. 1 is mounted on a suspension (also called a "knuckle") provided in a vehicle body of a vehicle (automobile) and rotatably supports a wheel. The bearing device 10 is also called a hub unit. In a state where the bearing device 10 is mounted on the vehicle body (suspension), the right side in FIG. 1 is a wheel side and called a vehicle outer side. The left side in FIG. 1 is a vehicle body center side and called a vehicle inner side.

The bearing device 10 includes an outer ring member (also called an outer member) 12, an inner shaft member (also called an inner member) 14, and a plurality of rolling elements 16 provided between the outer ring member 12 and the inner shaft member 14. The rolling elements 16 of this disclosure are balls. In the bearing device 10 of this disclosure, an axial direction is a direction parallel to a centerline C of the bearing device 10 (hereinafter referred to as a "bearing centerline C"). The axial direction of the bearing device 10 and an axial direction of a sealing device 46 to be described later coincide with each other. The axial direction of the bearing device 10 and the axial direction of the sealing device 46 will be each referred to simply as an "axial direction." A radial direction is a direction orthogonal to the bearing centerline C. The radial direction of the bearing device 10 and a radial direction of the sealing device 46 to be described later coincide with each other. The radial direction of the bearing device 10 and the radial direction of the sealing device 46 will be each referred to simply as a "radial direction." For the convenience of description, the vehicle outer side and the vehicle inner side will be referred to as "one side in the axial direction" and "the other side in the axial direction," respectively, in this disclosure.

The outer ring member 12 has an outer ring main body 22 having a cylindrical shape, and a flange 24 extending from the outer ring main body 22 toward a radially outer side. An outer ring raceway surface 26 is formed in an inner circumference of the outer ring main body 22, on each of the one side and the other side in the axial direction. The flange 24 is mounted onto the knuckle (not shown) that is a vehicle body-side member. The bearing device 10 including the outer ring member 12 is thereby fixed to the vehicle body. Each of an end 28 of the outer ring member 12 on the one side in the axial direction and an end 30 thereof on the other side in the axial direction has a cylindrical shape.

The inner shaft member 14 has a shaft-shaped hub shaft 32 (inner shaft) and an inner ring 34 fixed on the other side of the hub shaft 32 in the axial direction. The hub shaft 32 has a shaft main body 36 located radially inward of the outer ring member 12, and a flange 38 provided on the one side of the shaft main body 36 in the axial direction. The shaft main body 36 is a part elongated in the axial direction. The flange 38 is a part extending from the one side of the shaft main body 36 in the axial direction toward the radially outer side. While this is not shown, a brake rotor and a wheel are mounted onto the flange 38. The inner ring 34 is an annular member, and is fitted and fixed on an outer side of a part 40 of the shaft main body 36 on the other side in the axial direction.

A shaft raceway surface 42 is formed on an outer circumferential side of the shaft main body 36, and an inner ring raceway surface 44 is formed in an outer circumferential surface of the inner ring 34. A plurality of rolling elements 16 is provided between the outer ring raceway surface 26 and the shaft raceway surface 42 on the one side in the axial direction. A plurality of rolling elements 16 is provided between the outer ring raceway surface 26 and the inner ring raceway surface 44 on the other side in the axial direction. The rolling elements 16 are provided in two rows respectively on the one side and the other side in the axial direction. The rolling elements 16 in each row are held by a cage 18. This configuration allows the inner shaft member 14 to rotate around the bearing centerline C relatively to the outer ring member 12.

An annular bearing inner space 20 where the rolling elements 16 are provided is formed between the outer ring member 12 and the inner shaft member 14. To prevent foreign objects such as water from entering the bearing inner space 20 from an outside, the bearing device 10 further includes a pair of sealing devices 46, 48. The sealing device 46 is provided between the end 28 of the outer ring member 12 on the one side in the axial direction and the inner shaft member 14. The other sealing device 48 is provided between the end 30 of the outer ring member 12 on the other side in the axial direction and the inner shaft member 14 (inner ring 34). The sealing device 46 on the one side in the axial direction is called an outer-side sealing device 46. The sealing device 48 on the other side in the axial direction is called an inner-side sealing device 48.

Outer-Side Sealing Device 46

Figure 2:
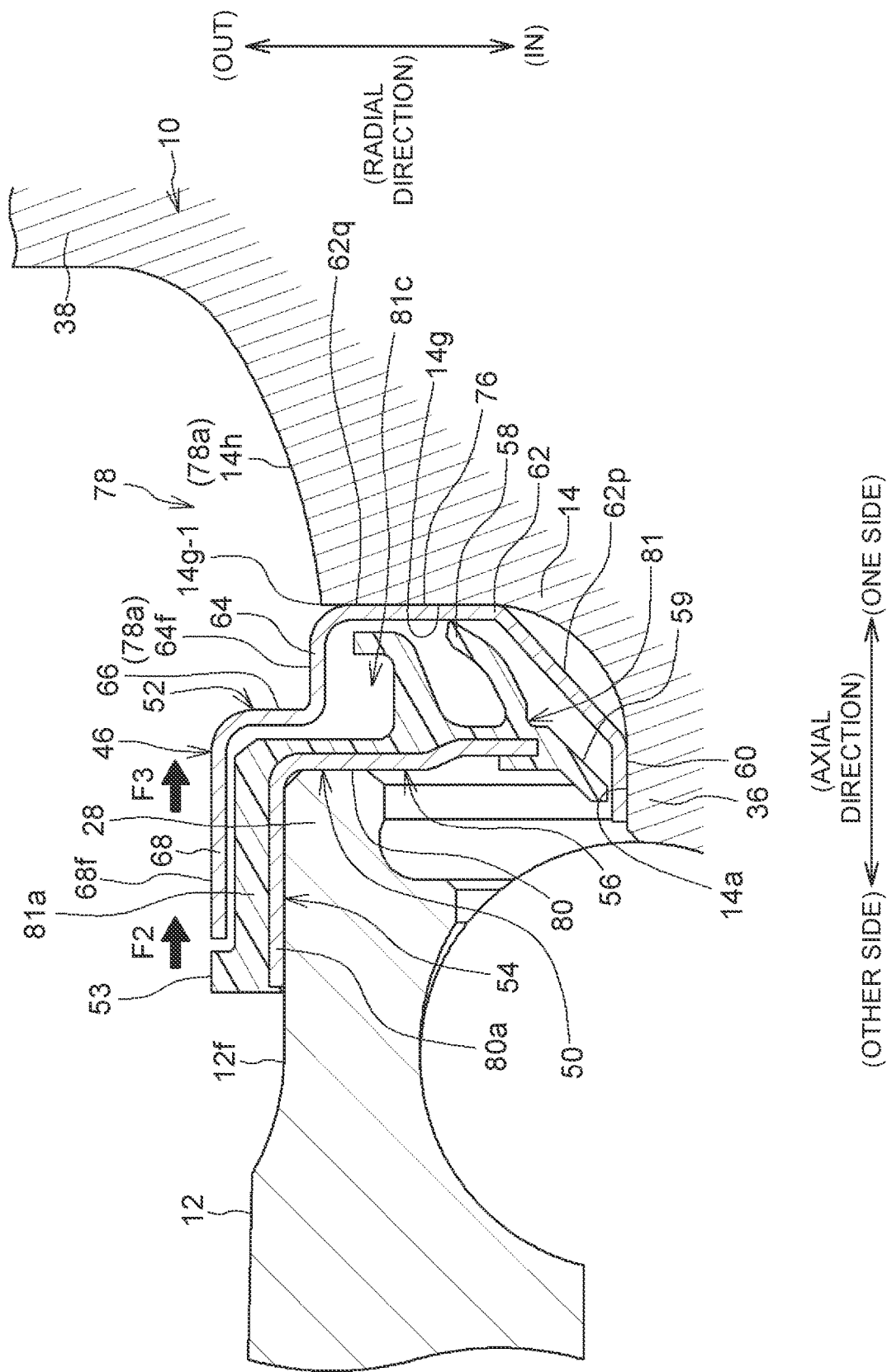
FIG. 2 is a sectional view showing an outer-side sealing device and surroundings thereof.
Figure 3:
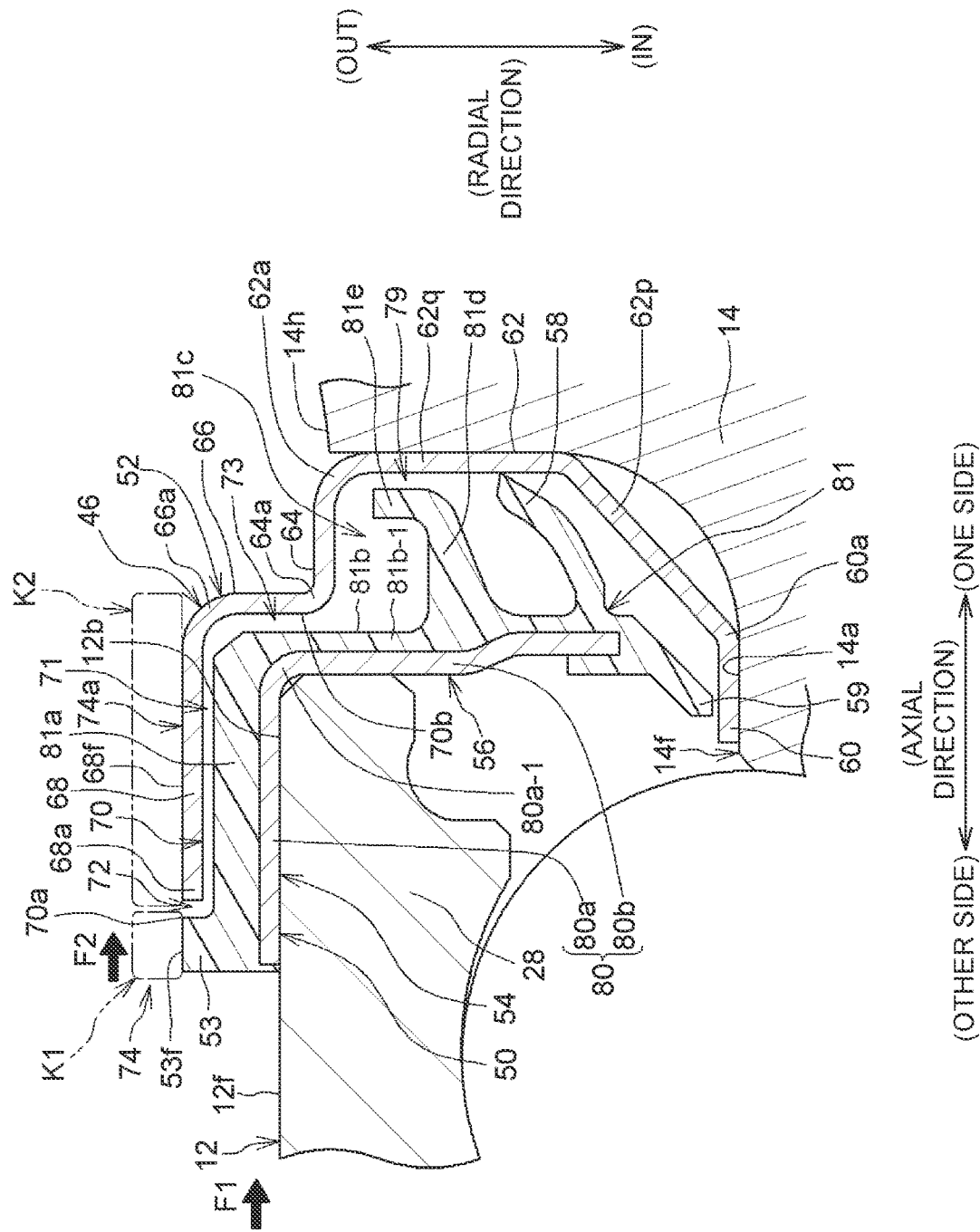
FIG. 3 is a sectional view of the outer-side sealing device.

FIG. 2 is a sectional view showing the outer-side sealing device 46 and surroundings thereof. FIG. 3 is a sectional view of the outer-side sealing device 46. The sealing device 46 includes an annular seal member 50 and an annular slinger 52. The seal member 50 is mounted on the outer ring member 12. The slinger 52 is mounted on the inner shaft member 14 and rotates with the inner shaft member 14.

In FIG. 3, the seal member 50 has a metal core (metal ring) 80 and a rubber seal member 81. The seal member 81 is fixed to the core 80 by cure adhesion. The core 80 has a cylindrical part 80a having a cylindrical shape, and an annular part 80b extending from an end 80a-1 of the cylindrical part 80a on the one side in the axial direction toward a radially inner side. The seal member 50 is fixed to the outer ring member 12 as the cylindrical part 80a is fitted on the end 28 of the outer ring member 12 with interference.

The seal member 81 has a cylindrical covering part 81*a* that covers the cylindrical part 80*a*, an annular covering part 81*b* that covers the annular part 80*b*, seal lips 58, 59 that are provided so as to extend from the annular covering part 81*b*, and an inner gutter 81*c*.

The seal lip (axial lip) 58 is provided so as to extend mainly in the axial direction, and is in contact with a part (first radial part 62) of the slinger 52. The seal lip (radial lip) 59 is provided so as to extend mainly in the radial direction. While the seal lip (radial lip) 59 may be in contact with another part (slinger fixing part 60) of the slinger 52, the seal lip 59 of this disclosure is provided close to that part, with a small clearance left therebetween.

The inner gutter 81*c* is provided so as to be integral with a portion 81*b*-1 of the annular covering part 81*b*. The inner gutter 81*c* is located radially outward of the seal lip 58. The inner gutter 81*c* has a cylindrical bottom 81*d* extending from the annular covering part 81*b* toward the one side in the axial direction, and an annular side wall 81*e* extending from an end of the bottom 81*d* on the one side in the axial direction toward the radially outer side. The inner gutter 81*c* is formed inside the sealing device 46 by the portion 81*b*-1 of the covering part 81*b*, the bottom 81*d*, and the side wall 81*e*.

The side wall 81*e* forms a side wall of the inner gutter 81*c* on the one side in the axial direction. The portion 81*b*-1 of the covering part 81*b* forms a side wall of the inner gutter 81*c* on the other side in the axial direction. The bottom 81*d* forms a bottom wall of the inner gutter 81*c*. The inner gutter 81*c* is formed as a circumferential groove opening toward the radially outer side. The inner gutter 81*c* is located radially inward of an inside opening 70*b* of a labyrinth clearance 70 to be described later. The opening 70*b* opens toward the radially inner side. Foreign objects such as water that have passed through the labyrinth clearance 70 are caught by the inner gutter 81*c*. Therefore, foreign objects such as water do not directly reach the contact part between the seal lip 58 and the slinger 52 (first radial part 62).

The seal member 50 further has a large-diameter part 53 having a larger outside diameter than the cylindrical covering part 81*a*. The large-diameter part 53 is a part continuous with the other side of the covering part 81*a* in the axial direction and formed by a part of the seal member 81. The large-diameter part 53, together with the covering part 81*a*, covers the cylindrical part 80*a*. The outside diameter of the large-diameter part 53 is larger than the outside diameter of a part 12*b* of an outer circumferential surface 12*f* of the outer ring member 12 (end 28) on which the seal member 50 is mounted. Thus, when seen in a direction along the outer circumferential surface 12*f* from the other side toward the one side in the axial direction, the large-diameter part 53 looks like a wall.

The cylindrical seal fixing part 54 is formed by the cylindrical covering part 81*a* of the seal member 81 and the cylindrical part 80*a* of the core 80. The seal fixing part 54 is mounted on the part 12*b* of the outer circumferential surface 12*f* of the outer ring member 12. The seal main body 56 is formed by the covering part 81*b*, the seal lips 58, 59, and the inner gutter 81*c* of the seal member 81, and the annular part 80*b* of the core 80.

The slinger 52 has a slinger fixing part 60, a first radial part 62, a first axial part 64, a second radial part 66, and a second axial part 68, in this order from the inner side toward the outer side in the radial direction.

The slinger fixing part 60 is a cylindrical part. The slinger fixing part 60 is mounted on a part 14*a* of the outer circumferential surface 14*f* of the inner shaft member 14. The slinger 52 is fixed to the inner shaft member 14 as the slinger fixing part 60 is fitted on the part 14*a* with interference.

The first radial part 62 has a tapered first portion 62*p* and an annular second portion 62*q*. The first portion 62*p* is a portion that is directed toward the radially outer side while extending from an end 60*a* of the slinger fixing part 60 on the one side in the axial direction toward the one side in the axial direction. The second portion 62*q* is a portion that extends from the first portion 62*p* toward the radially outer side. The seal lip 58 is in contact with the second portion 62*q*. A clearance 79 is provided between the second portion 62*q* and the inner gutter 81*c*. Thus, the first radial part 62 is a part which extends from the end 60*a* of the slinger fixing part 60 on the one side in the axial direction toward the radially outer side and with which the seal lip 58 is in contact.

The first axial part 64 is a cylindrical part extending from an end 62*a* of the first radial part 62 on the radially outer side toward the other side in the axial direction. The first axial part 64 is located at such a position as to cover an area larger than most part of the inner gutter 81*c* from the radially outer side. The outside diameter of the first axial part 64 and the outside diameter of a stepped surface 14*h* of the inner shaft member 14 at an end on the other side in the axial direction are set to be (substantially) equal. The stepped surface 14*h* will be described later.

The second radial part 66 is an annular part extending from an end 64*a* of the first axial part 64 on the other side in the axial direction toward the radially outer side. The second radial part 66 is located at such a position as to face the covering part 81*b* in the axial direction across a clearance (third clearance) 73. An end of the clearance 73 on the radially inner side forms the inside opening 70*b* of the labyrinth clearance 70. An outside opening of the labyrinth clearance 70, opposite from the opening 70*b*, is denoted by reference sign 70*a*. The inner gutter 81*c* is located radially inward of and directly below the clearance 73.

The second axial part 68 is a cylindrical part extending from an end 66*a* of the second radial part 66 on the radially outer side toward the other side in the axial direction. The second axial part 68 is located at such a position as to face the seal fixing part 54 in the radial direction across a clearance (first clearance) 71. An end 68*a* of the second axial part 68 on the other side in the axial direction and the large-diameter part 53 of the seal member 50 face each other in the axial direction across a clearance (second clearance) 72. The second clearance 72 opens toward the radially outer side. An upper end of the second clearance 72 forms the outside opening 70*a* of the labyrinth clearance 70.

In the sealing device 46 of this disclosure, the first clearance 71 and the second clearance 72 communicate with each other, and the first clearance 71 further communicates with the third clearance 73. Thus, the labyrinth clearance 70 includes the first clearance 71, the second clearance 72, and the third clearance 73. The specific dimensions etc. of the labyrinth clearance 70 will be described later.

An outer circumferential surface 53*f* of the large-diameter part 53 of the seal member 50 and an outer circumferential surface 68*f* of the second axial part 68 of the slinger 52 are equivalent (substantially equal) in diameter. The meaning of being equivalent in diameter here may include not only that two diameters are exactly the same but also that two diameters are slightly different from each other. The diameters of the outer circumferential surface 53*f* of the large-diameter part 53 and the outer circumferential surface 68*f* of the second axial part 68 may be different from each other within a range taking into account manufacturing errors of each of the seal member 50 and the slinger 52 and assembly dimensional errors upon assembly of these members (due to elastic deformation). The outer circumferential surface 53*f* of the large-diameter part 53 may be slightly larger in diameter than the outer circumferential surface 68*f* of the second axial part 68, or vice versa. "Slightly" here means, as a guide, for example, a value smaller than 1% of the diameter of the outer circumferential surface 68*f*.

Here, when the vehicle travels, water on the road surface is splashed and flows on the outer circumferential side of the bearing device 10 (see FIG. 2). Thus, the outer circumferential side of the outer ring member 12 serves as a flow passage for water to flow through. This water contains mud. An area in the flow passage in which the sealing device 46 is provided will be described. In FIG. 3, a region K1 radially outward of the large-diameter part 53 of the seal member 50 and a region K2 radially outward of the second axial part 68 of the slinger 52 form an outside flow passage 74 located radially outward of the sealing device 46.

The outside flow passage 74 is a continuous flow passage extending in a straight line along the axial direction. This means that in the outside flow passage 74, there is no wall orthogonal to the axial direction that significantly hinders the flow of water. As described above, the outer circumferential surface 53*f* of the large-diameter part 53 and the outer circumferential surface 68*f* of the second axial part 68 are equivalent (substantially equal) in diameter. Therefore, the outer circumferential surface 53*f* of the large-diameter part 53 and the outer circumferential surface 68*f* of the second axial part 68 are included in a flow passage surface 74*a* of the continuous outside flow passage 74 extending in a straight line along the axial direction. External water can flow in a straight line along the axial direction, along the flow passage surface 74*a* including the outer circumferential surface 53*f* of the large-diameter part 53 and the outer circumferential surface 68*f* of the second axial part 68.

Outer Gutter Structure 78

As shown in FIG. 2, the bearing device 10 of this disclosure includes an outer gutter structure 78 formed by a part of the inner shaft member 14 and a part of the sealing device 46. The gutter structure 78 is formed as a circumferential groove opening toward the radially outer side. The specific configuration of the gutter structure 78 will be described.

As described above, the inner shaft member 14 has the shaft main body 36 and the flange 38. The shaft main body 36 has the part 14*a* of the outer circumferential surface of the inner shaft member 14 at which the slinger fixing part 60 is fixed to the inner shaft member 14. The flange 38 is a part extending from the one side of the shaft main body 36 in the axial direction toward the radially outer side. The flange 38 has an annular wall surface 14*g* extending from the part 14*a* of the outer circumferential surface of the inner shaft member 14 toward the radially outer side, and the stepped surface 14*h* extending from an end 14*g*-1 of the wall surface 14*g* on the radially outer side toward the one side in the axial direction. The stepped surface 14*h* is a surface of which the outside diameter increases gradually toward the one side in the axial direction.

The first radial part 62 of the slinger 52 has a contact surface 76 that is in contact with the annular wall surface 14*g*. In this disclosure, a side surface of the annular second portion 62*q* on the one side in the axial direction forms the contact surface 76. An outer circumferential surface 64*f* of the first axial part 64 of the slinger 52 and the stepped surface 14*h* of the flange 38 form a bottom surface 78*a* of the common gutter structure 78. Thus, the outer circumferential surface 64*f* of the first axial part 64 and the stepped surface 14*h* of the flange 38 are included in the bottom surface 78*a* of the gutter structure 78. As described above, the outside diameter of the outer circumferential surface 64*f* of the first axial part 64 and the outside diameter of the stepped surface 14*h* at the end on the other side in the axial direction are set to be (substantially) equal. As shown in FIG. 2, the outside diameters of the outer circumferential surface 64*f* and the stepped surface 14*h* may be exactly the same, but may also be different from each other within the range of the value of the plate thickness of the first axial part 64. Thus, the bottom surface 78*a* continuous in the axial direction is constituted by the outer circumferential surface 64*f* of the first axial part 64 and the stepped surface 14*h*.

The gutter structure 78 can catch external water. In particular, the gutter structure 78 can catch water that has flowed toward the one side in the axial direction along the outer circumferential side of the bearing device 10. Water caught by the gutter structure 78 flows down along the circumferential groove of the gutter structure 78 and falls onto the road surface.

Specific Configuration of Labyrinth Clearance 70

Figure 4:
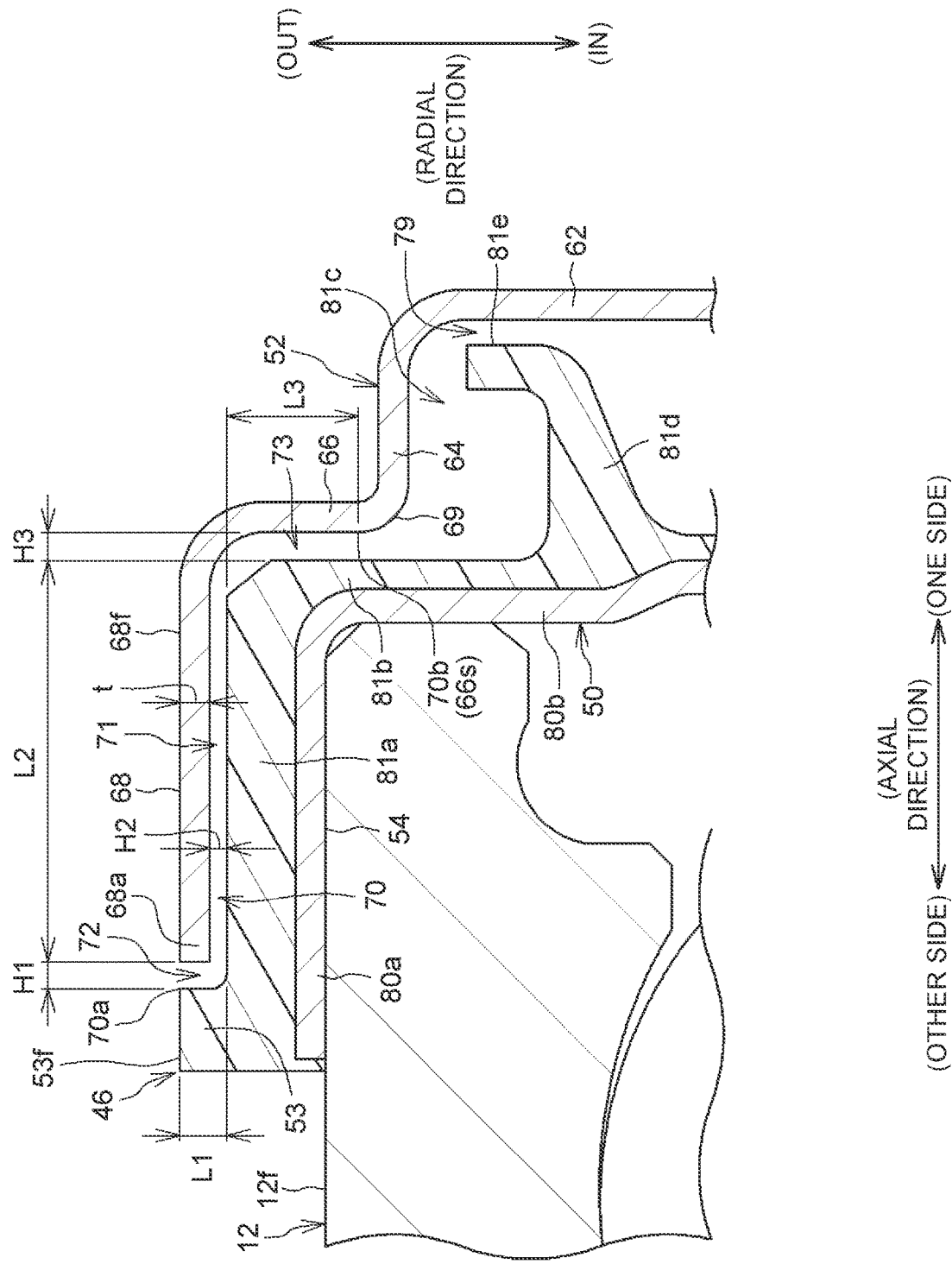
FIG. 4 is a sectional view showing a labyrinth clearance and surroundings thereof.
Figure 5:
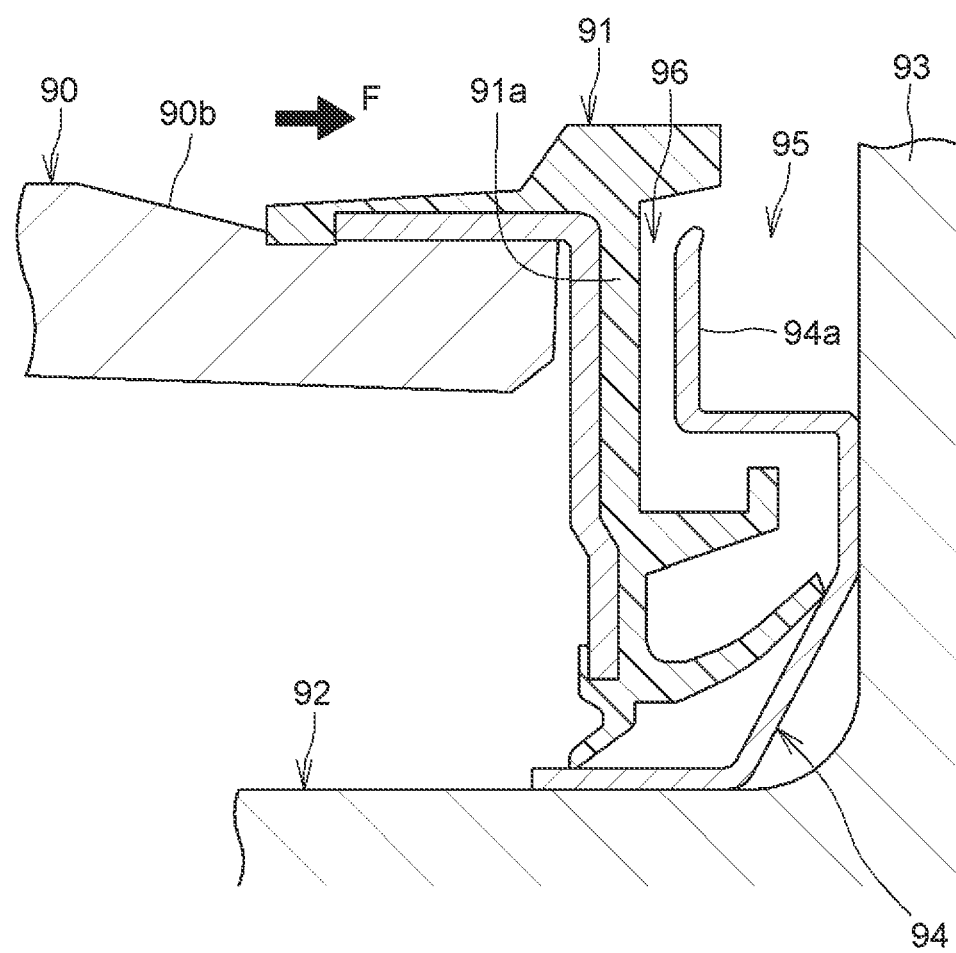
FIG. 5 is a sectional view showing a sealing device of a related art.
Figure 6:
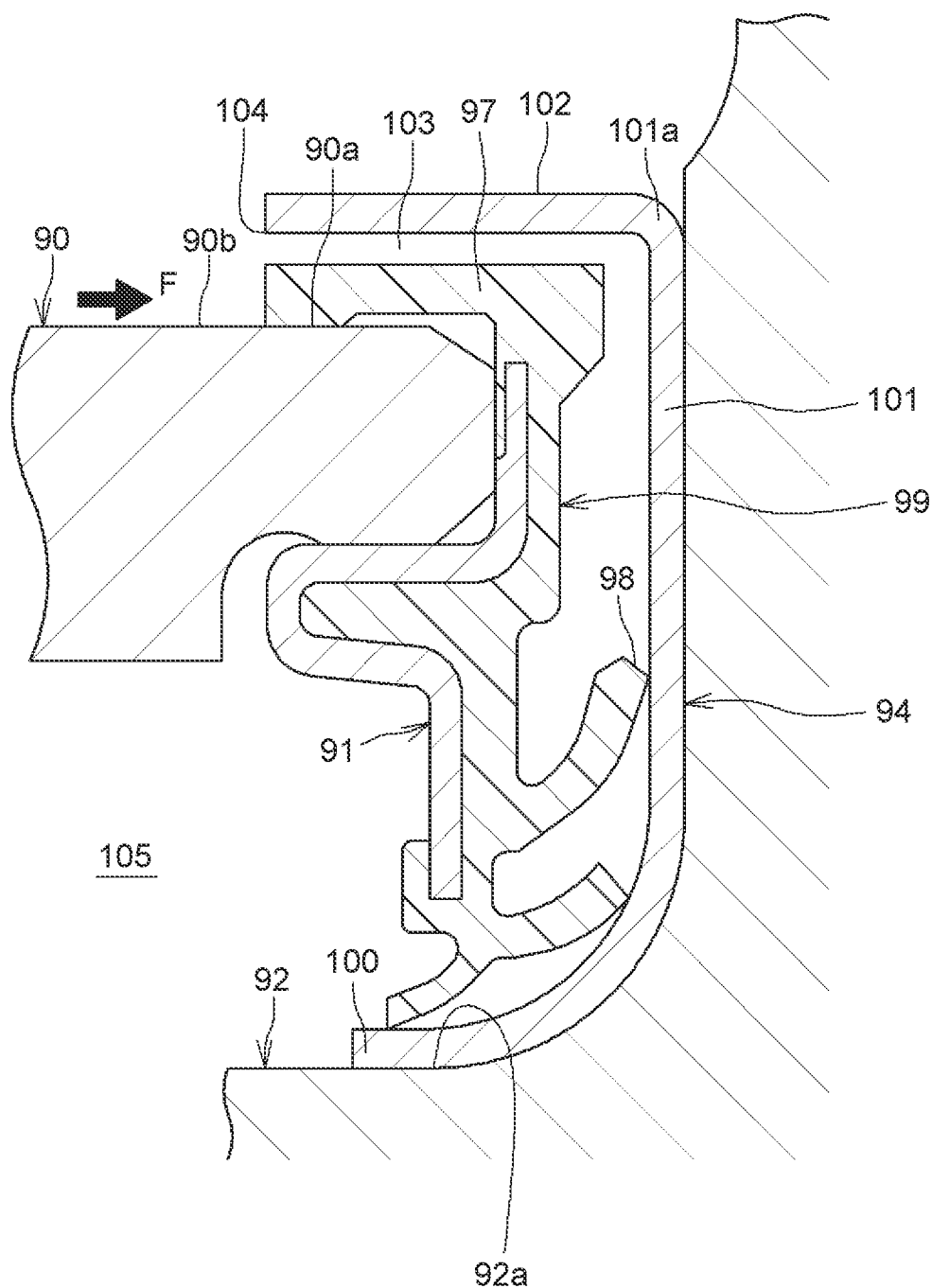
FIG. 6 is a sectional view showing a sealing device of another related art.

FIG. 4 is a sectional view showing the labyrinth clearance 70 and surroundings thereof. The labyrinth clearance 70 that restricts entry of external water is formed in the sealing device 46, between the seal member 50 and a part of the slinger 52. As described above, the labyrinth clearance 70 includes the first clearance 71, the second clearance 72, and the third clearance 73.

The second clearance 72 opens toward the outside. Hereinafter, the second clearance 72 will be also referred to as an "outer clearance 72." The third clearance 73 opens toward the inside of the sealing device 46. Hereinafter, the third clearance 73 will also be referred to as an "inner clearance 73." The first clearance 71 is a clearance located between the outer clearance 72 and the inner clearance 73, and is continuous with each of the outer clearance 72 and the inner clearance 73. Hereinafter, the first clearance 71 will also be referred to as a "central clearance 71." The opening on the outside of the outer clearance 72 is denoted by reference sign 70*a*. The opening in the inner clearance 73, on the inside of the sealing device 46 is denoted by reference sign 70*b*.

The inner clearance 73 is continuous with the central clearance 71, and the flow passage direction of the inner clearance 73 is orthogonal to that of the central clearance 71. The central clearance 71 is continuous with the outer clearance 72, and the flow passage direction of the central clearance 71 is orthogonal to that of the outer clearance 72. The "flow passage direction" means a direction in which water flows when passing through the labyrinth clearance 70. The flow passage direction of the outer clearance 72 should at least have a radial component, and coincides with the radial direction in this disclosure. The flow passage direction of the inner clearance 73 should at least have a radial component, and coincides with the radial direction in this disclosure. The flow passage direction of the central clearance 71 should at least have an axial component, and coincides with the axial direction in this disclosure.

A dimension (in the axial direction) H1 of the opening 70*a* of the outer clearance 72 is set to be 0.3 mm or larger and 0.7 mm or smaller (0.3 mm≤H1≤0.7 mm). As shown in FIG. 4, the outer clearance 72 is formed by an annular small space. The outer clearance 72 has a shape continuing in a straight line in the flow passage direction. Thus, the clearance dimension (in the axial direction) of the outer clearance 72 is constant along the radial direction and equal to the dimension H1 of the opening 70a. A length (in the radial direction) L1 of the outer clearance 72 in the flow passage direction is the distance from the opening 70a to an outer circumferential surface of the seal fixing part 54 (the cylindrical covering part 81a). The length L1 is equal to the sum of a thickness dimension (in the radial direction) t of the second axial part 68 of the slinger 52 and a clearance dimension (in the radial direction) H2 of the central clearance 71 (L1=t+H2).

The clearance dimension (in the radial direction) H2 of the central clearance 71 is set to be 0.3 mm or larger and 1.0 mm or smaller (0.3 mm≤H2≤1.0 mm). As shown in FIG. 4, the central clearance 71 is formed by a cylindrical small clearance. The central clearance 71 has a shape continuing in a straight line in the flow passage direction. Thus, the clearance dimension H2 of the central clearance 71 is constant along the axial direction. It is preferable that a length (in the axial direction) L2 of the central clearance 71 in the flow passage direction be set to be long. Therefore, the length L2 of the central clearance 71 in the flow passage direction is 3 mm or longer (L2≥3 mm). An upper limit value (as a guide) of the length L2 of the central clearance 71 is, for example, 7 mm (L2≤7 mm). This value is based on restrictions on the dimensions of the sealing device 46. The length L2 of the central clearance 71 is the distance from an end (end surface) of the second axial part 68 on the other side in the axial direction to a surface of the seal fixing part 54 (the cylindrical covering part 81a) on the one side in the axial direction.

A clearance dimension (in the axial direction) H3 of the inner clearance 73 is equal to the clearance dimension H2 of the central clearance 71. Thus, the clearance dimension H3 of the inner clearance 73 is set to be 0.3 mm or larger and 1.0 mm or smaller (0.3 mm≤H3≤1.0 mm). As shown in FIG. 4, the inner clearance 73 is formed by an annular small space. Since the inner clearance 73 has a shape continuing in a straight line in the flow passage direction, the clearance dimension H3 of the inner clearance 73 is constant along the radial direction and equal to the dimension of the opening 70b. It is preferable that a length L3 of the inner clearance 73 in the flow passage direction be set to be long. Therefore, the length (in the radial direction) L3 of the inner clearance 73 in the flow passage direction is 2.5 mm or longer (L3≥2.5 mm). An upper limit value (as a guide) of the length L3 of the inner clearance 73 is, for example, 4.0 mm (L3≤4.0 mm). This value is based on restrictions on the dimensions of the sealing device 46.

The length L3 of the inner clearance 73 is the distance from the outer circumferential surface of the seal fixing part 54 to a coupling portion 69 between the second radial part 66 and the first axial part 64 of the slinger 52. The coupling portion 69 has a rounded shape. Therefore, the length L3 is the distance from the outer circumferential surface of the seal fixing part 54 to a rounding start point 66s that is a point in the round coupling portion 69 on the side of the second radial part 66. The position of the rounding start point 66s coincides with the position of the opening 70b.

As has been described above, in the sealing device 46 of this disclosure, the labyrinth clearance 70 includes the outer clearance 72 opening outward, the central clearance 71 which is continuous with the outer clearance 72 and of which the flow passage direction intersects with that of the outer clearance 72, and the inner clearance 73 which is continuous with the central clearance 71 and of which the flow passage direction intersects with that of the central clearance 71. The dimension H1 of the opening 70a of the outer clearance 72 is 0.3 mm or larger and 0.7 mm or smaller. The central clearance 71 is set to be as long as possible to secure the length thereof in the flow passage direction, and the length L2 of the central clearance 71 in the flow passage direction is 3 mm or longer. The clearance dimension H3 of the inner clearance 73 is 0.3 mm or larger and 1.0 mm or smaller.

In the sealing device 46 having the labyrinth clearance 70 with the dimensions thus set, the labyrinth clearance 70 makes it less likely that external water enters inside the sealing device 46. The function of restricting entry of water by the labyrinth clearance 70 is enhanced in a state where the inner shaft member 14 is rotating relatively to the outer ring member 12, i.e., a state where the vehicle is traveling. On the other hand, when the vehicle stops and the inner shaft member 14 stops rotating and, moreover, the vehicle is in an environment where at least part of the sealing device 46 in the circumferential direction is under water, water may pass through the labyrinth clearance 70 and enter inside the sealing device 46 under the influence of a water pressure from the outside. It is when the road is flooded that at least part of the sealing device 46 in the circumferential direction is under water. An assumed depth of water when the road is flooded is, for example, a value equal to the level of the centerline C (see FIG. 1) of the bearing device 10 (the value of the radius of the wheel).

When the vehicle resumes traveling and the inner shaft member 14 rotates, water having entered inside the sealing device 46 is delivered toward the outside by a centrifugal force. The water is difficult to discharge due to the influence of the water pressure from the outside. However, a water film is formed in the outer clearance 72, the central clearance 71, and the inner clearance 73 of the labyrinth clearance 70 owing to the dimensions (the dimension H1, the length L2, and the dimension H3) of these parts set as described above, and this water film can exert a force against the water pressure from the outside. When the inner shaft member 14 rotates with a water film formed in the labyrinth clearance 70, a centrifugal force acts also on water inside the labyrinth clearance 70, particularly water inside the outer clearance 72 and the inner clearance 73 having the flow passages extending in the radial direction, which helps discharge the water inside to the outside. Since the water film formed in the labyrinth clearance 70 thus exerts a force against the water pressure from the outside, securing the function of this water film can enhance the water discharge efficiency of the sealing device 46. For this reason, the sealing device 46 of this disclosure can restrain water from entering inside and easily discharge water having entered inside to the outside.

When a water film is formed in the outer clearance 72, the central clearance 71, and the inner clearance 73 of the labyrinth clearance 70 owing to the settings of the dimensions (the dimension H1, the length L2, and the dimension L3) of these parts as described above, this water film functions like a lid. Entry of external water is more effectively restricted by the water film.

The clearance dimension H2 of the central clearance 71 is set to be 0.3 mm or larger and 1.0 mm or smaller. This configuration can enhance the function of restricting entry of external water and serves to maintain a water film formed in the central clearance 71. The inner clearance 73 is set to be as long as possible to secure the length thereof in the flow passage direction, and the length L3 of the inner clearance 73 in the flow passage direction is 2.5 mm or longer. This configuration can further enhance the function of restricting entry of external water and serves to maintain a water film formed in the central clearance 71.

As described above, the dimension H1 of the opening 70*a* of the outer clearance 72 is set to be 0.3 mm or larger and 0.7 mm or smaller. If the dimension H1 of the opening 70*a* is set to a value within this range, external water is less likely to enter due to surface tension of water in the opening 70*a*. It is especially preferable that the dimension H1 be 0.6 mm or smaller. In this case, the opening of the outer clearance 72 has a dimension of 0.6 mm or smaller.

If the dimension H1 of the opening 70*a* is set to be 0.3 mm or larger and 0.7 mm or smaller, a water film formed in the outer clearance 72 will have a meniscus with an appropriate shape in the opening 70*a* and this water film is maintained. Thus, the dimension H1 of the opening 70*a* is set to a value suitable for retaining a water film in the outer clearance 72, and further retaining a water film in the central clearance 71.

If the dimension H1 is smaller than 0.3 mm, the function of preventing entry of water into the sealing device 46 is enhanced but the efficiency of discharging water having entered inside decreases. If the dimension H1 exceeds 0.7 mm, the function of preventing entry of water may degrade. The outer clearance 72 functions to retain a water film in the central clearance 71 by water inside the outer clearance 72 (the flow passage resistance of the outer clearance 72). If the dimension H1 of the opening 70*a* exceeds 0.7 mm, the outer clearance 72 cannot be expected to create a flow passage resistance to water and may hardly function to retain a water film in the central clearance 71.

As described above, the length L2 of the central clearance 71 in the flow passage direction is set to be 3 mm or longer. If the length L2 is shorter than 3 mm, the central clearance 71 is too short to function to prevent entry of water. Moreover, if the length L2 is shorter than 3 mm, an effective water film having a force to withstand a water pressure from the outside is less likely to be formed in the central clearance 71. Thus, the central clearance 71 cannot be expected to create a flow passage resistance to water and may hardly function to retain a water film.

As described above, the clearance dimension H3 of the inner clearance 73 is set to be 0.3 mm or larger and 1.0 mm or smaller. If the clearance dimension H3 is smaller than 0.3 mm, the function of preventing entry of water into the sealing device 46 is enhanced but the efficiency of discharging water that has entered inside decreases. The clearance dimension H3 of the inner clearance 73 is set to a value suitable for retaining a water film in the inner clearance 73, and further retaining a water film in the central clearance 71.

If the clearance dimension H3 of the inner clearance 73 exceeds 1.0 mm, the function of preventing entry of water may degrade. The inner clearance 73 functions to retain a water film in the central clearance 71 by water inside the inner clearance 73 (the flow passage resistance of the inner clearance 73). If the clearance dimension H3 of the inner clearance 73 exceeds 1.0 mm, the inner clearance 73 cannot be expected to create a flow passage resistance to water and may hardly function to retain a water film in the central clearance 71.

One thing that the outer clearance 72 and the inner clearance 73 have in common is that both function to retain (i.e., keep) water (a water film) in the central clearance 71. However, the upper limit value (0.7 mm) of the clearance dimension H1 of the outer clearance 72 and the upper limit value (1.0 mm) of the clearance dimension H3 of the inner clearance 73 are different from each other for the following reasons. The outer clearance 72 is shorter in the flow passage direction. The inner clearance 73 is longer than the outer clearance 72 in the flow passage direction. Thus, a first reason is that the inner clearance 73 creates a larger flow passage resistance than the outer clearance 72. A second reason is that the outer clearance 72 opens outward while the inner clearance 73 is a clearance located on a deeper side of the labyrinth clearance 70 (far away from the opening 70*a*).

The above-described dimensions of the parts of the labyrinth clearance 70 are values that the inventor of the present disclosure has obtained by conducting numerous experiments and simulations.

Sealing Device 46 of this Disclosure

As has been described above, the sealing device 46 of this disclosure includes the seal member 50 and the slinger 52. As shown in FIG. 3, the seal member 50 has, on the outer circumferential side, the large-diameter part 53 that has a larger outside diameter than the seal fixing part 54. The large-diameter part 53 faces, in the axial direction, the end 68*a* of the second axial part 68 of the slinger 52 on the other side in the axial direction across the outer clearance (second clearance) 72. The central clearance (first clearance) 71 and the outer clearance (second clearance) 72 communicate with each other, and the sealing device 46 has the labyrinth clearance 70 including the central clearance 71 and the outer clearance 72. As described above, the outer circumferential surface 53*f* of the large-diameter part 53 and the outer circumferential surface 68*f* of the second axial part 68 are included in the flow passage surface 74*a* of the continuous outside flow passage 74 extending in a straight line along the axial direction.

In the sealing device 46 having this configuration, the labyrinth clearance 70 makes it less likely that external water enters inside the sealing device 46 where the seal lip 58 is present. As described above, the large-diameter part 53 has a larger outside diameter than the seal fixing part 54 and faces, in the axial direction, the end 68*a* of the second axial part 68 of the slinger 52 on the other side in the axial direction across the outer clearance 72. Thus, as the large-diameter part 53 functions as a barrier, water flowing toward the one side in the axial direction along the outer circumferential surface 12*f* of the outer ring member 12 (arrow F1) is less likely to enter inside the sealing device 46. Since the outer clearance 72 opens toward the radially outer side, even when a large volume of water flows and part of the water flows over the large-diameter part 53 toward the one side in the axial direction, this water is less likely to enter through the opening 70*a* of the outer clearance 72 and passes by the opening 70*a*.

The outer circumferential surface 53*f* of the large-diameter part 53 and the outer circumferential surface 68*f* of the second axial part 68 are included in the flow passage surface 74*a* of the continuous outside flow passage 74 extending in a straight line along the axial direction. Therefore, even when a large volume of water flows and part of the water flows over the large-diameter part 53 toward the one side in the axial direction (arrow F2), this water can pass by the opening 70*a* of the outer clearance 72, without stagnating near the opening 70*a*, and flow along the outer circumferential surface 68*f* of the second axial part 68. Thus, the water is less likely to enter through the opening 70*a* of the outer clearance 72. For these reasons, the sealing device 46 of this disclosure has an enhanced function of preventing external water from entering the space between the outer ring member 12 and the inner shaft member 14.

When the travel speed of the vehicle is low (e.g., 10 km per hour) and a large volume of water (e.g., five liters per minute) flows, the external water may enter inside the sealing device 46. However, the sealing device 46 having the configuration shown in FIG. 3 can restrict entry of water even when the travel speed of the vehicle is low and a large volume of water flows around the outer ring member 12.

As shown in FIG. 2, at least a portion of the first radial part 62 of the slinger 52 has the contact surface 76 that is in contact with the annular wall surface 14g of the inner shaft member 14. The inner shaft member 14 further has the stepped surface 14h extending from the end 14g-1 of the annular wall surface 14g on the radially outer side toward the one side in the axial direction. The outer circumferential surface 64f of the first axial part 64 of the slinger 52 and the stepped surface 14h of the inner shaft member 14 constitute the bottom surface 78a of the common gutter structure 78.

Thus, the gutter structure 78 is constituted by a part of the slinger 52 and a part of the inner shaft member 14. The bottom surface 78a of the gutter structure 78 is constituted by the outer circumferential surface 64f of the first axial part 64 of the slinger 52 and the stepped surface 14h of the inner shaft member 14. If a large volume of water flows toward the one side in the axial direction along the outer circumferential surface 12f of the outer ring member 12 and part of the water flows over the large-diameter part 53 toward the one side in the axial direction (arrow F2), and further flows along the outer circumferential surface 68f of the second axial part 68 (arrow F3), this water is caught by the gutter structure 78.

Other than the outer circumferential surface 64f of the first axial part 64 of the slinger 52, the stepped surface 14h of the inner shaft member 14 is also included in the bottom surface 78a of the gutter structure 78, which adds to the volume of the gutter structure 78. Thus, the gutter structure 78 can catch a large volume of water. Since water is caught by the gutter structure 78, water can be restrained from flowing toward the outer clearance 72 by changing its flow direction to a direction toward the other side in the axial direction. As a result, even when the volume of water is large, the water is allowed to fall down onto the road surface by the gutter structure 78, so that the water can be prevented from returning to the opening 70a of the labyrinth clearance 70 and entry of water is thus prevented.

As has been described above, the sealing device 46 of this disclosure has an enhanced function of preventing external water from entering the space between the outer ring member 12 and the inner shaft member 14. Moreover, the sealing device 46 is configured such that water that has entered inside the sealing device 46, if any, is easily discharged to the outside.

Others

In the bearing device 10 of this disclosure, the inner shaft member 14 rotates around the bearing centerline C relatively to the outer ring member 12. The sealing device 46 of this disclosure can also be applied to rolling bearing devices other than the rolling bearing device (hub unit) 10 for a wheel, as long as the rolling bearing device to which the sealing device 46 is applied has an outer member (outer ring member 12) and an inner member (inner shaft member 14) that rotate around the bearing centerline C relatively to each other. Thus, while this is not shown, depending on the application of the rolling bearing device, the outer member may rotate around the bearing centerline relatively to the inner member.

Various changes can be made to the forms of the outer ring member (outer member) 12 and the inner shaft member (inner member) 14. Changes can be made to the forms of the seal member 50 and the slinger 52 within the scope of the present disclosure, and forms other than those shown in the drawings may also be adopted.

The embodiment disclosed this time is in every respect merely illustrative and not restrictive. The technical scope of the present disclosure is not limited to the above embodiment, and this technical scope includes all changes within a scope equivalent to that of the configuration described in the claims.

What is claimed is:

1. A sealing device comprising:
an annular seal member mounted on an outer member; and
an annular slinger mounted on an inner member that rotates relatively to the outer member, wherein:
the annular seal member has a cylindrical seal fixing part that is mounted on a part of an outer circumferential surface of the outer member, and a seal main body that has a seal lip;
the annular slinger has a slinger fixing part that is mounted on a part of an outer circumferential surface of the inner member; a first radial part which extends from an end of the slinger fixing part on one side in an axial direction toward a radially outer side and with which the seal lip comes into contact; a first axial part that extends from an end of the first radial part on the radially outer side toward the other side in the axial direction; a second radial part that extends from an end of the first axial part on the other side in the axial direction toward the radially outer side; and a second axial part that extends from an end of the second radial part on the radially outer side toward the other side in the axial direction and faces the cylindrical seal fixing part in a radial direction across a first clearance;
the annular seal member has a large-diameter part that has a larger outside diameter than the cylindrical seal fixing part and faces, in the axial direction, an end of the second axial part on the other side in the axial direction across a second clearance;
an outer circumferential surface of the large-diameter part and an outer circumferential surface of the second axial part are included in a flow passage surface of a continuous outside flow passage that extends in a straight line along the axial direction;
the first clearance and the second clearance communicate with each other, and the sealing device has a labyrinth clearance including the first clearance and the second clearance;
at least a portion of the first radial part has a contact surface that is in contact with an annular wall surface of the inner member that extends toward the radially outer side from a part of the outer circumferential surface of the inner member at which the slinger fixing part is fixed to the inner member;
an outer circumferential surface of the first axial part and a stepped surface of the inner member that extends from an end of the annular wall surface on the radially outer side toward the one side in the axial direction constitute a bottom surface of a common gutter structure; and
the outer circumferential surface of the first axial part and the stepped surface define the bottom surface that continuously extends in the axial direction.

2. The sealing device according to claim 1, wherein the outer circumferential surface of the large-diameter part and the outer circumferential surface of the second axial part are equivalent in diameter.

3. The sealing device according to claim 1, wherein the second clearance has a dimension of 0.6 mm or smaller.

4. A rolling bearing device comprising:
the sealing device according to claim 1,
the outer member;
the inner member; and
a plurality of rolling elements provided between the outer member and the inner member; and
wherein the sealing device prevents foreign objects from entering a bearing inner space which is between the outer member and the inner member and in which the rolling elements are provided.

5. The rolling bearing device according to claim 4, wherein:
the inner member has a shaft main body that has the part of the outer circumferential surface of the inner member at which the slinger fixing part is fixed to the inner member, and a flange that extends from one side of the shaft main body in the axial direction toward a radially outer side;
the flange has an annular wall surface that extends toward the radially outer side from the part of the outer circumferential surface of the inner member at which the slinger fixing part is fixed to the inner member, and a stepped surface that extends from an end of the annular wall surface on the radially outer side toward the one side in the axial direction;
at least a portion of the first radial part of the annular slinger has a contact surface that is in contact with the annular wall surface; and
an outer circumferential surface of the first axial part and the stepped surface constitute a bottom surface of a common gutter structure.

\* \* \* \* \*